(12) United States Patent
Johnson

(10) Patent No.: US 6,741,692 B1
(45) Date of Patent: *May 25, 2004

(54) METHOD OF AND SYSTEM FOR PRIORITY CALL PROCESSING BASED UPON ELECTRONIC MAIL STATUS

(75) Inventor: William J. Johnson, Flower Mound, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,024

(22) Filed: Dec. 17, 1999

(51) Int. Cl.[7] .................................................. H04M 3/42
(52) U.S. Cl. ........................ 379/211.01; 379/201.08; 379/201.07; 379/201.01; 379/202.01
(58) Field of Search .................... 379/211.01, 211.02

(56) References Cited

U.S. PATENT DOCUMENTS

| 5,293,250 | A | * | 3/1994 | Okumura et al. | ........... 358/402 |
|---|---|---|---|---|---|
| 5,625,680 | A | * | 4/1997 | Foladare et al. | ............ 379/199 |
| 5,819,046 | A | * | 10/1998 | Johnson | |
| 5,872,841 | A | * | 2/1999 | King et al. | ............ 379/205.01 |
| 5,991,394 | A | * | 11/1999 | Dezonno et al. | ............ 379/199 |
| 6,018,572 | A | * | 1/2000 | Foladare et al. | ....... 379/211.01 |

OTHER PUBLICATIONS

Newton's Telecom dictionary, by Harry Newton, Mar. 1998.*

* cited by examiner

*Primary Examiner*—Ahmad F. Matar
*Assistant Examiner*—Karen Le

(57) ABSTRACT

A method of and system for providing priority call processing based upon the status of electronic mail items between a called party and a calling party receives a request to set up a call between the calling party and the called party and determines if the called party has priority call processing activated or enabled. If so, the system determines if there is a priority electronic mail item between the called party and the calling party. If so, the system provides special processing of the call.

28 Claims, 5 Drawing Sheets

METHOD OF AND SYSTEM FOR PRIORITY CALL PROCESSING BASED UPON ELECTRONIC MAIL STATUS

BACKGROUND

The present invention relates generally to the field of telephone and electronic mail system integration, and more particularly to a method of and system for providing priority call processing based upon electronic mail status between a calling party and a called party.

Current telephone systems, implemented in circuit switched environments, such as the public switched telephone network (PSTN) or private branch exchange (PBX) networks, or in packet switched environments, such Internet protocol (IP) telephony systems, provide many options for enhancing the usefulness of the system to users. For example, voice mail enables users to have their calls answered by an automated system that records a voice message from the calling party if the called party is unavailable or desires not to take the call. Call forwarding allows a user to have calls to their number forwarded to another number. Call forwarding can be combined with voice mail so that a user can have calls forwarded automatically to voice mail. Certain telephone devices include a do not disturb (DND) key that is used to automatically forward calls to voice mail, a secretary, or a message center.

Voice mail and call forwarding thus enable a user not to be disturbed during meetings or during periods when the user wishes to work without being interrupted with telephone calls. However, there are times that a user would like to receive certain priority calls at the same time the user wishes not to be bothered with normal calls. For example, a user may have sent a priority or urgent electronic mail item to a party and expect a call from that party regarding the electronic mail item. In such case, the user might wish not to receive most calls, but the user would certainly want to speak immediately to the recipient of the electronic mail item. Currently, the user must either receive all calls, or monitor his or her voice mail box for messages from the recipient of the electronic mail item. If a caller ID display is available the calling party must call from a recognized phone and the called party must be able to recognize the caller ID.

SUMMARY

The present invention provides a method of and system for providing priority call processing based upon the status of electronic mail items between a called party and a calling party. The present invention may be implemented in a circuit switched telephone network, such as the public switched telephone network (PSTN) or a private branch exchange (PBX) network, or in a packet switched network, such as an Internet telephony system. Suitable application programming interfaces (APIs) are provided between the telephone system elements and an electronic mail system.

When the system of the present invention receives a request to set up a call between the calling party and the called party, the system determines if the called party has priority call processing activated or enabled. If not, the system provides normal call processing. However, if priority call processing is enabled or activated, the system determines if there is a priority electronic mail item between the called party and the calling party. If so, the system provides special processing of the call.

An example of a priority electronic mail item is an electronic mail item to or from the calling party that the called party has designated a priority item, as for example by placing the electronic mail item in a priority electronic mail repository. Another example of a priority electronic mail item is an item that is inherently of a priority nature, such as a confirm on delivery (COD) electronic mail item. For example, a call will receive priority processing according to the present invention if the called party has sent an unanswered COD electronic mail item to the calling party. A call will also receive priority processing according to the present invention if the called party has sent a COD electronic mail item to the calling party within a predetermined time prior to receiving the call.

Priority call processing according to the present invention includes such processing as providing special call waiting and overriding call forwarding. Special call waiting according to the present invention includes determining if the called party number is busy, waiting the priority call, and providing a special priority call waiting announcement or tone to the called party. If the called party number is forwarded to another number, such to voice mail, a do not disturb number, or simply another number, priority call processing according to the present invention rings the called party number in an appropriate manner based upon the status (e.g., a pre-selected number of times), to allow the called party to answer, and then forwards the call to the call forwarding number.

DETAILED DESCRIPTION

Figure 1:
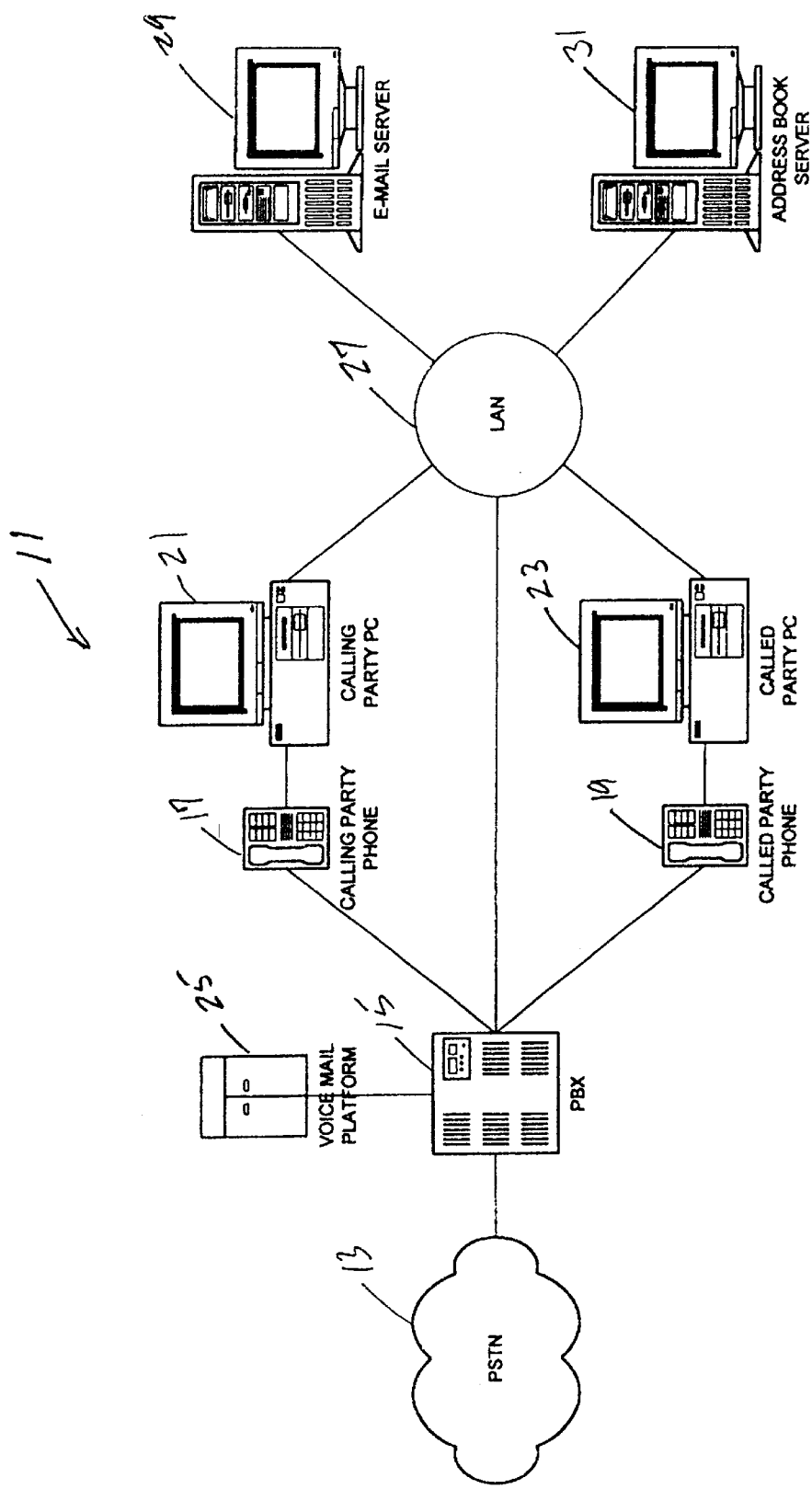
FIG. 1 is a block diagram of a circuit switched network according to the present invention.

Referring now to the drawings, and first to FIG. 1, a circuit switched embodiment of the present invention is designated generally by the numeral 11. System 11 is implemented in a private telephone network that accesses the public switched telephone network (PSTN) 13 through a private branch exchange (PBX) switch 15.

System 11 includes a plurality of telephone devices, including a calling party telephone 17 and a called party telephone 19, connected to PBX 15. Calling party telephone 17 and called party telephone 19 are each associated with a respective user identified by a telephone number or extension. According to the present invention, each user is also associated with a personal computer. Thus, user of calling party telephone 17 is associated with a calling party personal computer 21. Similarly, user of called party telephone 19 is associated with a called party personal computer 23. Personal computers 21 and 23 for each identified by a network address and an electronic mail address associated with their respective users. According to the present invention, telephones 17 and 19 are interface to personal computers 21 and 23, respectively, by a suitable communications interface, such as an M-WAVE™ or ROLM244 PC™ interface, in a manner well known to those skilled in the art.

The telephone portion of system 11 includes a voice mail platform 25 interfaced to PBX 15, in the manner well known to those skilled in the art. Voice mail platform 25 cooperates with PBX 15 to provide standard voice mail services as well as enhanced integrated telephone and electronic mail service according to the present invention. Voice mail platform 25 includes an administrative interface that is preferably implemented in a voice response unit that enables users to administer their voice mail boxes in the manner well known to those skilled in the art. As will be explained in detail hereinafter, the administrative interface of voice mail platform 25 enables users of system 11 to administer call processing according to the present invention.

Personal computers 21 and 23 operate in local area network (LAN) environment 27. LAN 27 is preferably interfaced to a wide area network or to the Internet (neither shown). LAN 27 includes an electronic mail server 29 and an address book server 31. Electronic mail server 29 and address book server 31 provide standard electronic mail and address book services, respectively. Electronic mail server 29 and address book server 31 also provide services according to present invention PBX 15 through suitable application programming interfaces (APIs), as will be explained detail hereinafter.

Figure 2:
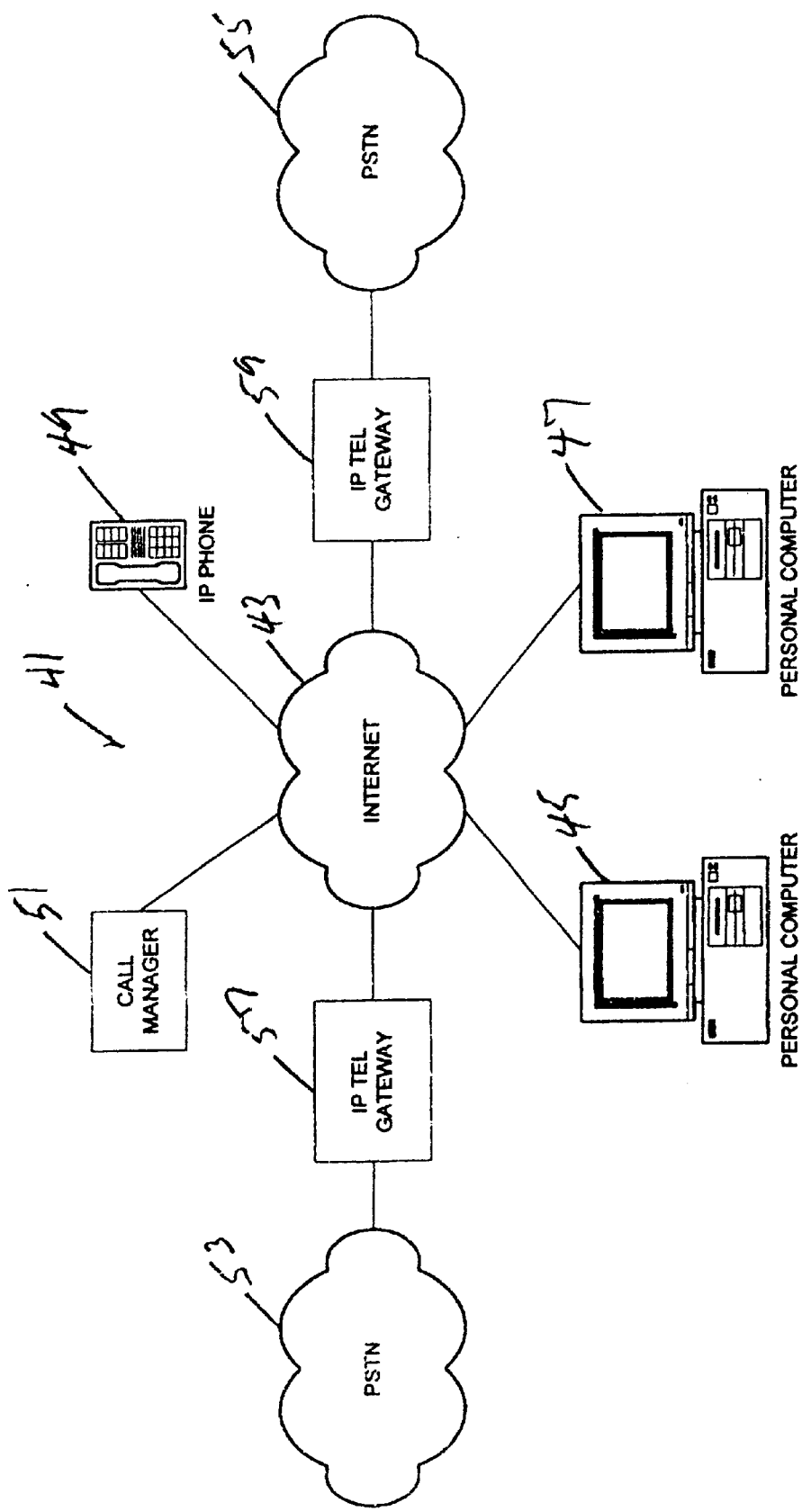
FIG. 2 is a block diagram of a packet switched network according to the present invention.

Referring now to FIG. 2, the present invention also operates in a packet switched telephone system such as an Internet protocol (IP) telephone network 41. In network 41, calls are set up using a signaling protocol such as session initiation protocol (SIP) or H.323 protocol. After setup, calls are transported across Internet 43 using a protocol such as real-time transport protocol (RTP), or the like. Calls can be made between calling parties and called parties across Internet 43 using Web phone enabled personal computers, such as personal computers 45 and 47, and Internet phone devices, such as IP phone 49. A call manager 51, which in the preferred embodiment includes a SIP proxy server, provides services such as local number portability, call forwarding, quality of service, and other services during call setup. Network 41 is interfaced to public switched telephone networks 53 and 55 through IP telephony gateways 57 and 59, respectively. Thus, calls can be made between IP telephony users and PSTN users.

In network 41, such services as voice mail, electronic mail, and address book are provided by applications that reside on servers or personal computers. Voice mail, electronic mail, and address book applications may be implemented in a shared client-server environment, or they may be implemented as stand-alone applications on an individual personal computer. In any event, and as will be apparent to the skilled in the art, suitable APIs are provided according to present invention to integrate the voice mail, electronic mail, and address book functions.

Figure 3:
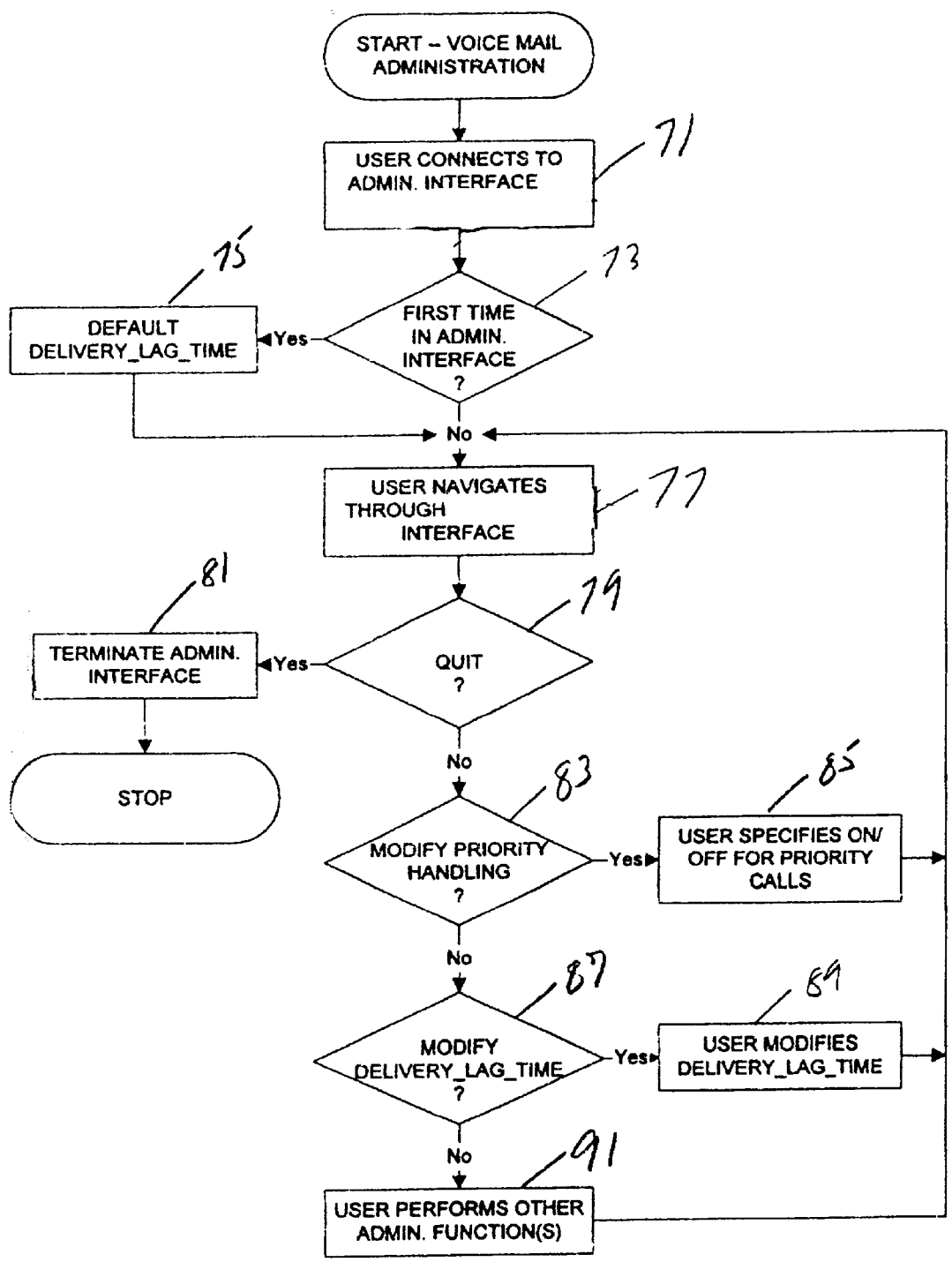
FIG. 3 is a flowchart of voice mail administration processing according to the present invention.

Referring now to FIG. 3, there is shown a flowchart of voice mail administration processing according to one embodiment of the present invention. The embodiment of FIG. 3 finds particular application in the circuit switched environment of FIG. 1 or alternatively, in the environment of FIG. 2. The administration interface of the voice mail system provides a user interface by which the user can interact with the system of the present invention. In FIG. 3, the user connects to the administration interface by telephone, as indicated at block 71. In one embodiment, the user connects to the administration interface by dialing a particular number or extension. The administration interface includes a voice response unit that guides the user through audio menus.

After the user has connected to the administration interface, the system tests, at decision block 73, if the current session is the user's first visit to the administrative interface. If so, the system sets a default delivery lag time, at block 75. The system of the present invention treats, as priority, recently delivered electronic mail items. According to the present invention, items delivered within the delivery lag time prior to the time that a particular call is initiated are considered recently delivered and deemed to be priority mail items.

If, at decision block 73, the user has previously visited the administration interface, the user navigates through the interface, as indicated generally at block 77. During navigation, the user is presented with prompts that are mapped to menu items. Typically, a user can exit or quit the administration interface by entering a particular DTMF signal or by hanging up. If, at decision block 79, the user selected to quit, the administrative interface is terminated, at block 81, and FIG. 3 processing ends. If, at decision block 83, it is determined the user entered a DTMF signal indicating the user's desire to modify priority handling, the user is prompted to specify ON or OFF for priority call handling, at block 85. As will be explained in detail hereinafter, if the user specifies ON for priority calls, then calls will receive priority processing according to present invention. If the user specifies OFF, then calls will be processed normally. If, at decision block 87, it is determined that the user entered a DTMF signal indicating the user's desire to modify delivery lag time, the system prompts the user to enter a delivery lag time, at block 89. For example, the user may be prompted to enter digits corresponding to a number of days and/or hours. As indicated at block 91, the user may perform other administration functions that are typical in currently existing voice mail systems. FIG. 3 processing continues until the user quits, as determined at decision block 79. In an alternative embodiment, an IP phone may be used in a similar fashion to accomplish FIG. 3 administration. In another embodiment, a personal computer equipped with telephone-like functionality may be used to accomplish FIG. 3 administration.

Figure 4:
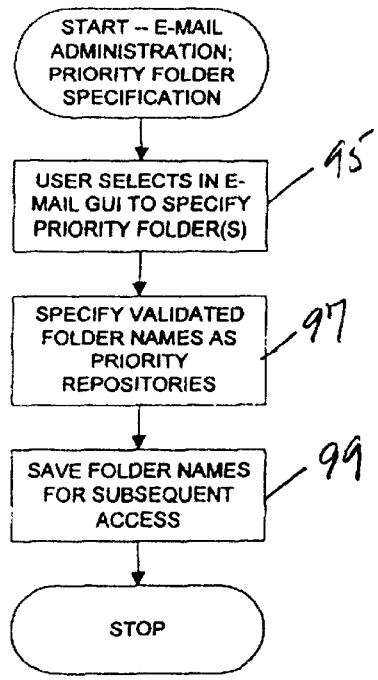
FIG. 4 is a flowchart of electronic mail administration with priority folder specification processing according to the present invention.
Figure 5:
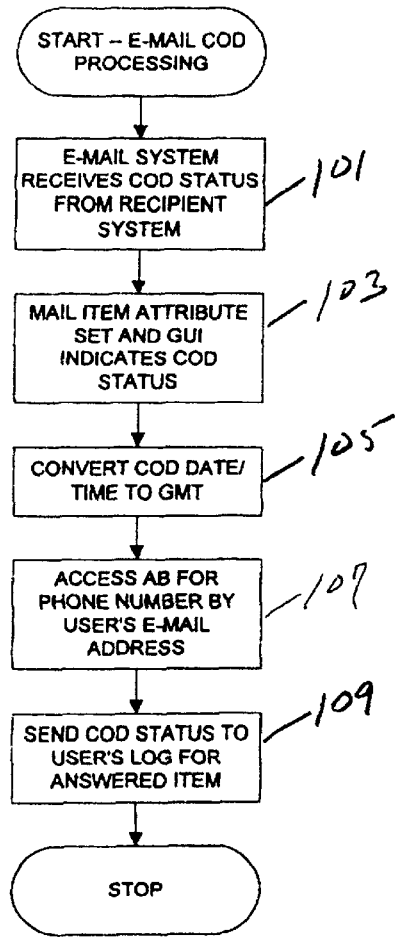
FIG. 5 is a flowchart of electronic mail confirm on delivery (COD) processing according to the present invention.

Referring now to FIG. 4, there is shown a flowchart of electronic mail administration and priority folder specification according to present invention. In addition to recently delivered electronic mail items, the system of the present invention treats, as priority, electronic mail items that a user has placed in a priority repository or folder. In FIG. 4 processing, the user selects in an electronic mail graphical user interface (GUI) to specify priority folders, at block 95. Graphical user interfaces and their implementations are generally well-known to those skilled in the art. During priority folder specification, the user is prompted to specify one or more validated folder names as priority repositories, at block 97. The system then saves the folder name or names for subsequent access, at block 99. In addition to electronic mail items placed in a priority folder, confirm on delivery (COD) electronic mail items are deemed to be of a priority nature. COD electronic mail items are those for which the sending party has requested confirmation of delivery. Confirmation of delivery is typically reserved for electronic mail items that the sending party deems to be particularly important. Referring to FIG. 5, there is shown electronic mail confirmation of delivery processing according to the present invention. The electronic mail system receives confirmation on delivery status from a recipient electronic mail system, at block 101. A COD attribute is set for the mail item and the user's electronic mail graphical user interface indicates COD status, at block 13. Then, the system converts the COD date and time to Greenwich mean time (GMT), at block 105. After converting to GMT, the system uses the recipient's electronic mail address to access the address book for the recipient's telephone number, at block 107. According to the present invention, the PBX maintains a log for each user of COD status. At block 109, electronic mail system sends COD status for the answered item to the user's log, and FIG. 4 processing ends.

Figure 6:
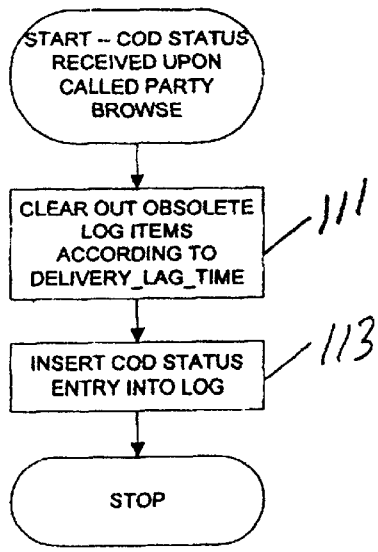
FIG. 6 is a flowchart of COD status processing according to the present invention.

Referring now to FIG. 6, there is shown a flowchart of COD status maintenance that is performed when a user browses his or her electronic mail. When the user browses his or her electronic mail, the system clears out obsolete log items according to delivery lag time, at block 111. Thus, the system deletes from the log COD items delivered earlier than the delivery lag time. Then, the system inserts a COD status entry into the log, at block 113 for a COD marked item that the user browses.

Figure 7:
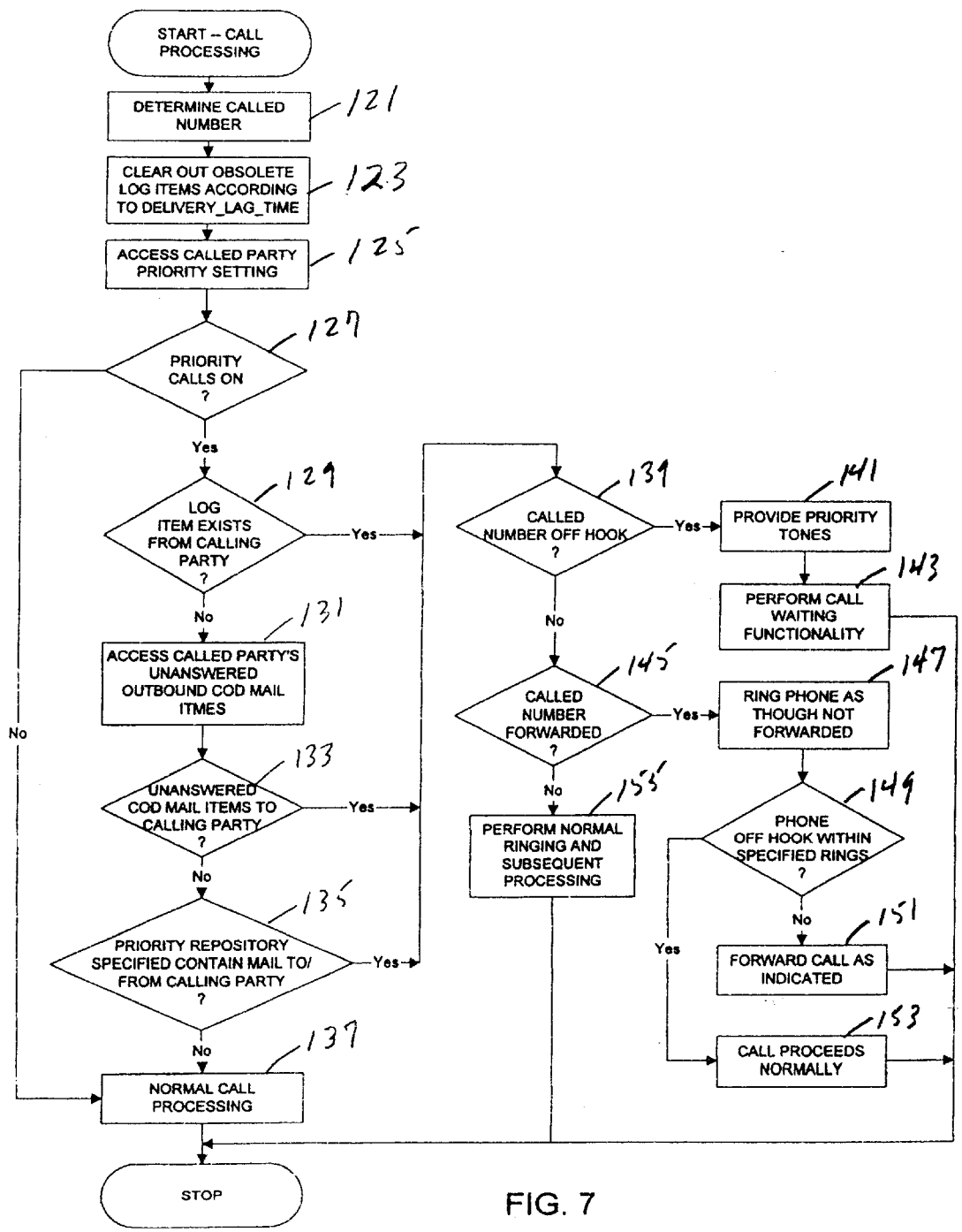
FIG. 7 is a flowchart of call processing according to the present invention.

Referring now to FIG. 7, there is shown a flowchart of call processing according to the present invention. FIG. 5 processing may be performed in connection with a terminating switch or terminating PBX, in a circuit switched telephony environment, or a terminating personal computer in an IP telephony environment. When a call is received, the terminating switch, PBX, or personal computer determines the called number, at block 121. According to the present invention, the system clears out obsolete log items according to the delivery lag time, at block 123. Then, the system accesses the call party's priority setting, at block 125. It will be recalled that the priority setting is either ON or OFF. If, at decision block 127, the priority setting is ON, the system tests, at decision block 129, if a log item exists from the calling party. The calling party's identity is determined by the caller ID number received with the call. If a log item exists from the calling party, then the system performs priority processing as described hereinafter.

If, at decision block 129, a log item does not exist from the calling party, then the system accesses the called party's unanswered outbound COD mail items, at block 131. Then, the system tests, at decision block 133, if there are any unanswered COD electronic mail items from the called party to the calling party. If so, the system performs priority call processing. If, at decision block 133, there are no unanswered COD items, then the system accesses the called party's priority repository or repositories and tests, at decision block 135, if the repository contains any electronic mail items to or from the calling party. If so, the system performs priority call processing. If not, the system performs normal call processing, as indicated generally at block 137.

During priority call processing, the system tests, at decision block 139, if the called number is off hook or busy. If so, the system provides priority tones, at block 141, and performs call waiting functionality, at block 143. Priority tones comprise a signal or announcement to the called party that a priority call is waiting. The system performs call waiting functionality so that the called party can answer the priority call.

If, at decision block 139, the called number is on hook, the system tests, at decision block 145, if the called number is forwarded. If so, the system overrides call forwarding by ringing the called number as though the number were not forwarded, at block 147. Typically, a user invokes call forwarding either to avoid receiving non-priority calls or to receive calls at another location. Since it is not known what motivated the called party to invoke call forwarding, the system rings the called number only a specified limited number of times. If, at decision block 149, the phone does not go off hook within the specified number of rings, the system forwards the call as indicated, at block 151. If the called party answers the call within the specified number of rings, the call proceeds normally, as indicated at block 153. Referring back to decision block 145, if the called number is not forwarded, then the system performs normal ringing and subsequent processing, as indicated at block 155.

From the foregoing, it may be seen that the present invention is well adapted to overcome the shortcomings of the prior art. The present invention provides greater flexibility in allowing a user to receive priority calls while using features, such as voice mail and call forwarding, to avoid answering non-priority calls, and while he or she is on a call to another party. The present invention is applicable to both circuit switched telephone systems and packet switched telephone systems.

What is claimed is:

1. A method of processing a call, which comprises the steps of:

receiving a request to set up a call between a calling party and, a called party; determining if said called party has a call priority setting on; and, if said called party has said priority setting on, providing special processing of said call based upon electronic mail status between said calling party and, said called party, wherein said electronic mail status between said calling party and said called party includes the existence of an electronic mail item between said calling party and said called party in a priority repository of said called party.

2. The method as claimed in claim 1, wherein said electronic mail status between said calling party and, said called party includes the existence of a priority electronic mail item between said called party and, said calling party.

3. The method as claimed in claim 2, wherein said priority electronic mail item is a confirm on delivery mail item from said called party to said calling party.

4. The method as claimed in claim 2, wherein said priority electronic mail item is a confirm on delivery mail item from said called party to said calling party delivered within a set time period prior to receipt of said request to set up said call.

5. The method as claimed in claim 4, wherein said time period is set by said called party.

6. The method as claimed in claim 2, wherein said priority mail item is an unanswered confirm on delivery electronic mail item from said called party to said calling party.

7. The method as claimed in claim 1, wherein said step of providing special processing of said call based upon electronic mail status between said calling party and, said called party includes the step of:

waiting said call if said called party telephone device is busy.

8. The method as claimed in claim 7, including the step of:

providing a special notification to said calling party that a priority call is waiting.

9. The method as claimed in claim 1, including the step of:

overriding call forwarding.

10. The method as claimed in claim 9, wherein said step of overriding call forwarding includes the step of:

ringing the number of said called party if said called number is forwarded to a second number.

11. The method as claimed in claim 10, including the step of:
   forwarding said call to said second number if the telephone device associated with said called party number is not answered within a selected number of rings.

12. The method as claimed in claim 10, wherein said ringing includes the step of: providing a special priority ringing tone.

13. A priority call processing system, which comprises:
   an electronic mail system for transferring electronic mail items between a calling party and a called party;
   a telephone system for setting up calls between said calling party and said called party; and,
   intelligence for providing priority call processing of a call from said calling party to said called party based upon the status of electronic mail items delivered between said called party and said calling party.

14. The system as claimed in claim 13, wherein said telephone system includes a circuit switched telephone system.

15. The system as claimed in claim 13, wherein said telephone system includes a packet switched telephone system.

16. The system as claimed in claim 15, wherein said packet switched telephone system includes an Internet telephony system.

17. A method of processing a call, which comprises the steps of:
   receiving a request to set up a call between a calling party and a called party;
   determining if said called party has a call priority setting set to on;
   if said called party has said call priority setting set to on, determining status of electronic mail between said called party and said calling party; and,
   processing said call based upon said status.

18. The method as claimed in claim 17, wherein said step of determining said status includes the step of:
   determining if there exists an unanswered confirm on delivery electronic mail from said called party to said calling party.

19. The method as claimed in claim 17, wherein said step of determining said status includes the step of:
   determining if there exists an unanswered confirm on delivery electronic mail delivered from said called party to said calling party within a particular delivery lag time prior to receipt of said call.

20. The method as claimed in claim 17, wherein said step of determining said status includes the step of:
   determining if there exists an answered confirm on delivery electronic mail from said called party to said calling party.

21. The method as claimed in claim 17, wherein said step of determining said status includes the step of:
   determining if there exists an electronic mail between said called party and, said calling party in a priority repository of said called party.

22. The method as claimed in claim 17, wherein said step of processing said call includes the step of:
   providing priority processing to said call if said status indicates a priority electronic mail item between said calling party and said called party.

23. The method as claimed in claim 22, wherein said step of providing priority processing includes the step of:
   determining if the telephone device associated with said called party is busy.

24. The method as claimed in claim 23, including the step of:
   providing priority call waiting if said telephone device is busy.

25. The method as claimed in claim 23, including the step of:
   if said telephone device is not busy, determining if said the number of said called party is forwarded.

26. The method as claimed in claim 25, including the step of:
   if said number is forwarded, ringing said number as though not forwarded.

27. The method as claimed in claim 26, including the step of:
   forwarding said call if said number is not answered within a particular number of rings.

28. A method of processing a call, the method comprising:
   specifying by a first user priority handling of the call, wherein the first user transmits an electronic mail message to a second user to request placement of the call to the first user by the second user;
   determining whether the electronic mail message is a priority mail item based upon a delivery lag time corresponding to time of delivery of the electronic mail message to the second user; and
   selectively providing priority handling of the call based upon the specification by the first user and the determination that the electronic mail message is a priority mail item.

* * * * *